United States Patent
Meskin

(10) Patent No.: US 10,414,441 B2
(45) Date of Patent: Sep. 17, 2019

(54) BOLSTER FOR FRONT END MODULE STRUCTURE OF A VEHICLE AND METHOD OF MAKING A BOLSTER

(71) Applicant: Valeo North America, Inc., Troy, MI (US)

(72) Inventor: Issmail Meskin, Troy, MI (US)

(73) Assignee: Valeo North America, Inc., Troy, MI (US)

(*) Notice: Subject to any disclaimer, the term of this patent is extended or adjusted under 35 U.S.C. 154(b) by 153 days.

(21) Appl. No.: 15/809,275

(22) Filed: Nov. 10, 2017

(65) Prior Publication Data

US 2019/0144044 A1    May 16, 2019

(51) Int. Cl.

| | | |
|---|---|---|
| B62D 25/08 | (2006.01) | |
| B29C 45/14 | (2006.01) | |
| B62D 27/00 | (2006.01) | |
| B62D 29/04 | (2006.01) | |
| B29K 101/12 | (2006.01) | |
| B29K 705/12 | (2006.01) | |
| B29L 31/30 | (2006.01) | |
| B60R 21/013 | (2006.01) | |

(52) U.S. Cl.
CPC ............ B62D 25/085 (2013.01); B29C 45/14 (2013.01); B62D 27/00 (2013.01); B62D 29/04 (2013.01); B29K 2101/12 (2013.01); B29K 2705/12 (2013.01); B29L 2031/3002 (2013.01); B60R 21/013 (2013.01)

(58) Field of Classification Search
CPC .......................... B62D 25/084; B62D 25/085
USPC ............... 296/187.09, 193.09, 193.1, 203.02
See application file for complete search history.

(56) References Cited

U.S. PATENT DOCUMENTS

| | | |
|---|---|---|
| 6,634,702 B1 | 10/2003 | Pleschke et al. |
| 2002/0060476 A1 | 5/2002 | Cantineau et al. |
| 2009/0302642 A1* | 12/2009 | Guyomard ........... B62D 25/084 296/193.09 |
| 2014/0284966 A1* | 9/2014 | Maier .................. B62D 25/085 296/193.04 |

(Continued)

FOREIGN PATENT DOCUMENTS

EP    1048554 A2    11/2000

OTHER PUBLICATIONS

International Search Report and Written Opinion in corresponding International Application No. PCT/US2018/058841, dated Feb. 11, 2019 (13 pages).

*Primary Examiner* — Jason S Morrow
(74) *Attorney, Agent, or Firm* — Osha Liang LLP

(57) ABSTRACT

A bolster assembly of a front end module for a vehicle that includes a composite structure having a first plurality of openings, a metal insert having a first end, a second end, and a second plurality of openings, a plurality of rivets that are inserted into the first plurality of openings of the composite structure and the second plurality of openings of the metal insert to fix the composite structure to the metal insert, the first plurality of openings being aligned with the second plurality of openings, and an injected plastic structure having a plurality of ribbing feet that holds together the composite structure and the metal insert such that the first end and the second end of the metal insert is in direct contact with the injected plastic structure to increase a shearing resistance of the bolster assembly.

13 Claims, 6 Drawing Sheets

(56) References Cited

U.S. PATENT DOCUMENTS

| | | | |
|---|---|---|---|
| 2016/0023623 A1* | 1/2016 | Diehl | B62D 27/06 |
| | | | 293/133 |
| 2016/0311472 A1* | 10/2016 | Lanard | B62D 25/084 |
| 2017/0129325 A1* | 5/2017 | Kaneko | B60K 11/04 |
| 2017/0282704 A1* | 10/2017 | Gassmann | B60K 11/04 |
| 2017/0313361 A1* | 11/2017 | Watanabe | B62D 25/08 |
| 2018/0178848 A1* | 6/2018 | Velasco | B62D 25/085 |
| 2018/0304934 A1* | 10/2018 | Andre | B62D 25/084 |

\* cited by examiner

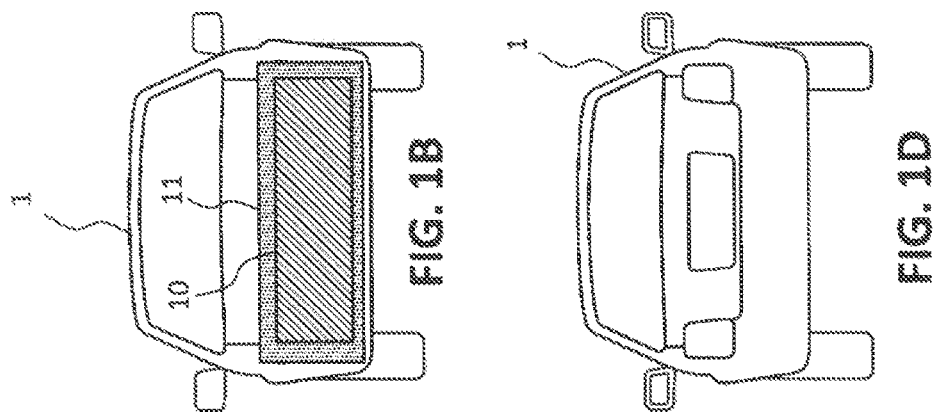
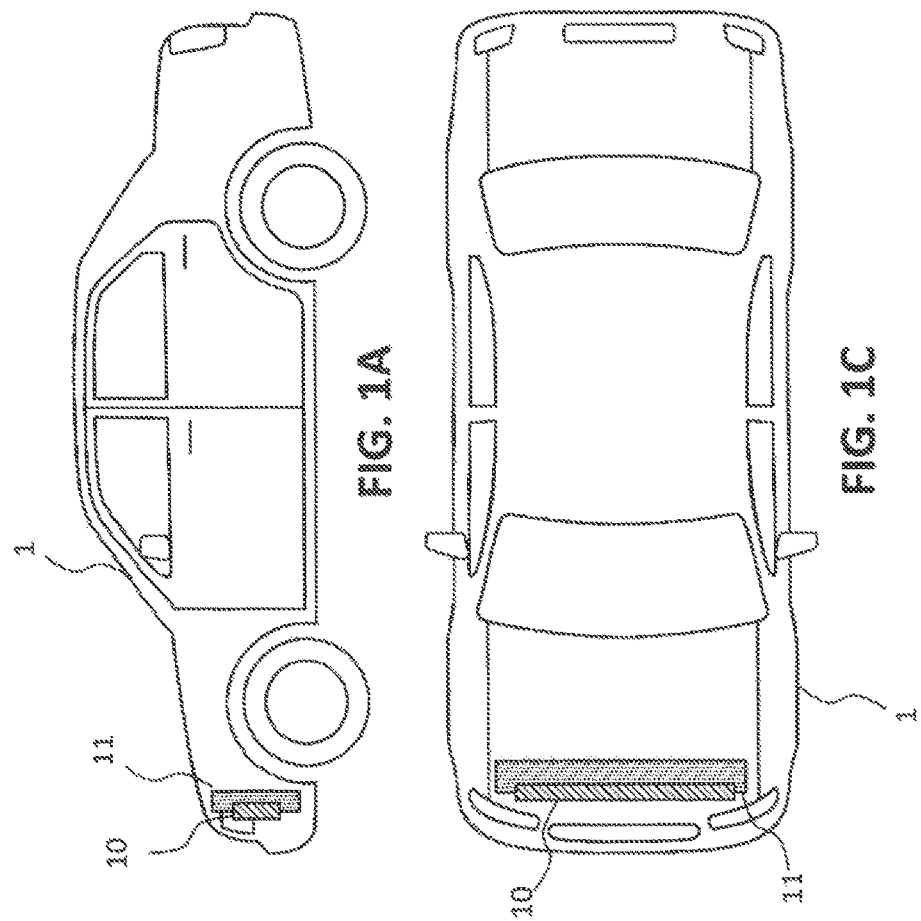

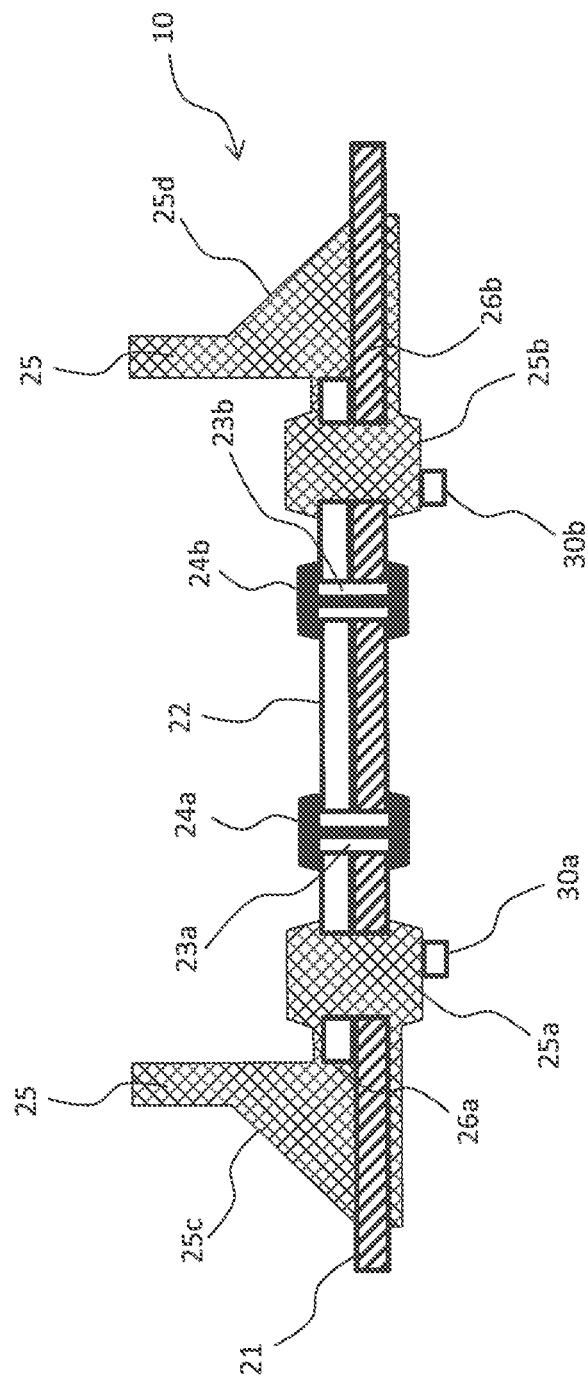

BOLSTER FOR FRONT END MODULE STRUCTURE OF A VEHICLE AND METHOD OF MAKING A BOLSTER

BACKGROUND

New regulations for vehicle manufacturing push for a reduction of carbon dioxide emissions for new vehicles. The standard emission limitations will be limited between 43 mpg for a car consumption, and 153 g/m to 163 g/m of carbon dioxide emissions.

As a result, Original Equipment Manufacturers (OEMs) are moving toward manufacturing and implementing lightweight materials, such as aluminum, continuous fiber prepreg (which may be a fibrous material pre-impregnated with a particular synthetic resin, used in making reinforced plastics), composite materials and magnesium, in the body in white (or BIW that refers to the stage in automobile manufacturing in which a car body's sheet metal components have been welded together) and exterior systems.

Prepregs and composite technologies are introduced in vehicle development as a lightweight technology, particularly for front-end module structures for implementing full-mono technology concepts, meaning only a single material is used in each component. For example, lightweight bolsters in mass production conventionally include a structure that is made of a single material structure. The use of lightweight single material bolsters enables significant mass reduction of the vehicles.

Full-mono technologies have some limitations. One limitation is related to concerns regarding requirement for high stress and high load resistance that the front end assembly has to endure. This is important, for example, in case of crash or pedestrian impact resistance. Another limitation is related to the dynamic behavior of a front end module assembly. Implementation of sensors in the front end modules that are made of thermoplastic resin can be difficult by the OEMs due the variations in dynamic behavior. The difference and variation in dynamic rigidity of manufactured components may be a problem when crash sensors are attached to the components that are replaced by an organosheet or composite thermoplastic because re-calibration of the sensors must be conducted for each particular component.

SUMMARY

In one aspect, a bolster assembly of a front end module for a vehicle comprises a composite structure having a first plurality of openings; a metal insert having a first end, a second end, and a second plurality of openings; a plurality of rivets that are inserted into the first plurality of openings of the composite structure and the second plurality of openings of the metal insert to fix the composite structure to the metal insert, the first plurality of openings being aligned with the second plurality of openings; and an injected plastic structure having a plurality of ribbing feet that holds together the composite structure and the metal insert.

In one aspect, the first end and the second end of the metal insert are in direct contact with the injected plastic structure to increase a shearing resistance of the bolster assembly.

In one aspect, the plurality of rivets observe a minimum amount of a stress that results from application of a force to the metal insert.

In one aspect, the first end and the second end of the metal insert transmit majority of the force to the plurality of ribbing feet of the injected plastic structure through a tied contact between the metal insert and the injected plastic structure.

In one aspect, the bolster assembly further comprises a plurality of crash sensors attached to the front end module.

In one aspect, the plurality of crash sensors are calibrated according to a dynamic behavior of a second bolster assembly of a second front end module for the vehicle that is constructed, and wherein the second bolster assembly is made of metal.

In one aspect, the composite structure is a thermoplastic composite material selected from a group consisting of: plastic, resin, and elastomer.

In one aspect, the metal insert is steel or stainless steel.

In one aspect, a method of manufacturing a bolster assembly of a front end module for a vehicle, comprises placing and positioning a composite structure and a metal insert with respect to each other to align a first plurality of openings of the composite structure with a second plurality of openings of the metal insert; affixing the composite structure and the metal insert to each other with a plurality of rivets to construct a first assembly; placing the first assembly in a mold for overmolding; and injecting plastic into the mold to overmold the first assembly to produce a second assembly.

In one aspect, the method further comprises post-processing the second assembly to remove excess plastic from second assembly to produce the bolster.

In one aspect, the first end and the second end of the metal insert is in direct contact with the injected plastic to increase a shearing resistance of the bolster assembly.

In one aspect, the method further comprises attaching a plurality of crash sensors are attached to the front end module.

In one aspect, the plurality of crash sensors are calibrated according to a dynamic behavior of a second bolster assembly of a second front end module for the vehicle, and wherein the second bolster assembly is made of metal.

BRIEF DESCRIPTION OF DRAWINGS

Certain embodiments of the present disclosure will be described with reference to the accompanying drawings. However, the accompanying drawings illustrate only certain aspects or implementations of the present disclosure by way of example and are not meant to limit the scope of the claims.

FIGS. 1A, 1B, 1C, and 1D show views of a motor vehicle having a front end module and a bolster assembly according to one or more embodiments of the invention.

FIG. 3C shows a composite structure and a metal insert fixed together with a plurality of rivets and an injected plastic structure having a plurality of ribbing feet that holds together the composite structure and the metal insert are over-molded according to one or more embodiments of the invention.

DETAILED DESCRIPTION

Figure 2:
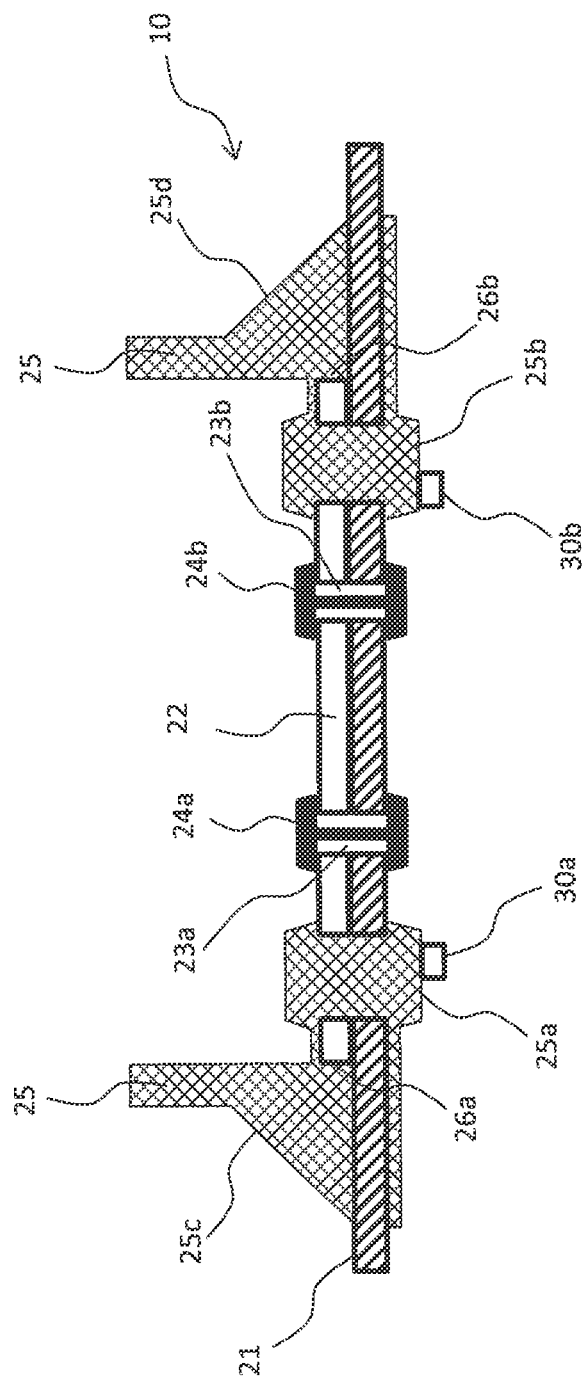
FIG. 2 shows a bolster assembly of a front end module for a vehicle according to one or more embodiments of the invention.

Specific embodiments will now be described in detail with reference to the accompanying figures. Like elements in the various figures are denoted by like reference numerals for consistency. Like elements may not be labeled in all figures for the sake of simplicity.

In the following detailed description, numerous specific details are set forth in order to provide a more thorough understanding of one or more embodiments of the invention. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create a particular ordering of the elements nor to limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a vane" includes reference to one or more of such vanes.

In general, embodiments of the present disclosure relate to a front end module for a motor vehicle. Specifically, embodiments of the invention are directed to a composite part for a bolster of a front-end module that is reinforced locally with steel inserts. Such a composite part introduces ductility in the front-end assembly at desired locations and also enables manufacturers to avoid performing re-calibration after a material change.

FIGS. 1A, 1B, 1C, and 1D show views of a motor vehicle having a front end module and a bolster assembly according to one or more embodiments of the present application. In one or more embodiment, the motor vehicle 1 includes a front end module 11 that includes a bolster assembly 10. The front end module may further include lighting, radiators, cooling fans, air conditioning condensers, grille-opening reinforcement panels, crumple zones, bumpers, hood latches, washer bottles, and the corresponding electronics and wiring. The bolster assembly 10 may be made of first and second side members, a lower cross member having an extension, and an upper cross member (not shown in detail). Those skilled in the art would appreciate that the combination of the first side member, the second side member, and the lower cross member may be collectively referred to as a bolster assembly 10. Also, for simplicity of drawings, the bolster assembly 10 has been shown as substantially flat, but Those skilled in the art would appreciate that the bolster assembly 10 may be curved or may be in a shape to fit to a front end module of a vehicle.

FIG. 2 shows a bolster assembly of a front end module for a vehicle according to one or more embodiments. The bolster assembly 10 includes a composite structure 21, a metal insert 22, a plurality of rivet holders 23a-23b, a plurality of rivets 24a-24b, an injected plastic structure 25, and a plurality of crash sensors 30a-30b. The injected plastic structure 25 includes a plurality of injected plastic rivets 25a-25b, and a plurality of ribbings 25c-25d. The metal insert 22 includes a first end and a second end of the metal insert 26a-26b.

The composite structure 21 may be a flat composite sheet or a curved composite sheet. The composite structure 21 may be formed in a mold with layer by layer application of composite materials.

The metal insert 22 may be a flat metal sheet or a curved metal sheet that is pressed to form a shape that may fit the front end module. The metal insert 22 may be made of metals such as steel, stainless steel, aluminum, magnesium, or any type of alloy of these metals.

The plurality of rivets 24a-24b may be short metal pins, bolts, and/or mechanical fasteners, and screws which may be the same or different. The plurality of rivets 24a-24b may be a smooth cylindrical shaft with a head on one end and headless on the other end being beaten out or pressed down when in place. The headless end is upset, or bucked (i.e., deformed) so that it expands to, for example, about 1.5 times the original shaft diameter, holding the rivet in place.

The injected plastic structure 25 may be formed by injection molding of thermoplastic material. Examples of thermoplastic materials include, but are not limited to, Polypropylene (PP), Polyurethane (PUR), Poly-Vinyl-Chloride (PVC), ABS, Polyamide (PA, Nylon 6/6, Nylon 6), Polystyrene (PS), Polyethylene (PE), POM (polyoxymethylene), Polycarbonate (PC), Acrylic (PMMA), PBT (polybutylene terephthalate), Polyethylene Teraphthalate (PET), and ASA (acrylonitrile styrene acrylate). The injected plastic structure 25 may include a plurality of ribbings 25c-25d that are formed, for example, to attach various components to the bolster assembly that is part of the front end module. The plurality of ribbings 25c-25d may also be formed to attach the front end module to the body of vehicle. Therefore, one of ordinary skill in the art would appreciate that the plurality of ribbings 25c-25d may be formed in any shape and size to attach various components, such as wiring, fan, etc, to the front end module and/or attach the front end module to a body of a vehicle.

The plurality of crash sensors 30a-30b are provided to function as a part of a typical air bag system. The plurality of crash sensors 30a-30b are designed to save the passenger in case of serious crash by activating the air back system but are also designed to prevent the air bag from inflating when the car goes over a bump or a pothole, or in the case of a minor collision.

Figure 3A:
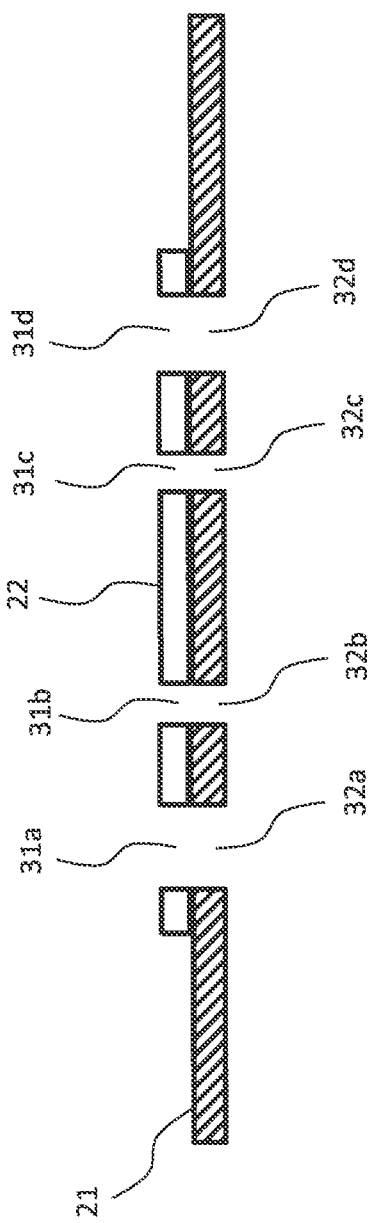
FIG. 3A shows a composite structure having a first plurality of openings and a metal insert having a second plurality of openings of a bolster assembly of a front end module for a vehicle according to one or more embodiments of the invention.
Figure 3B:
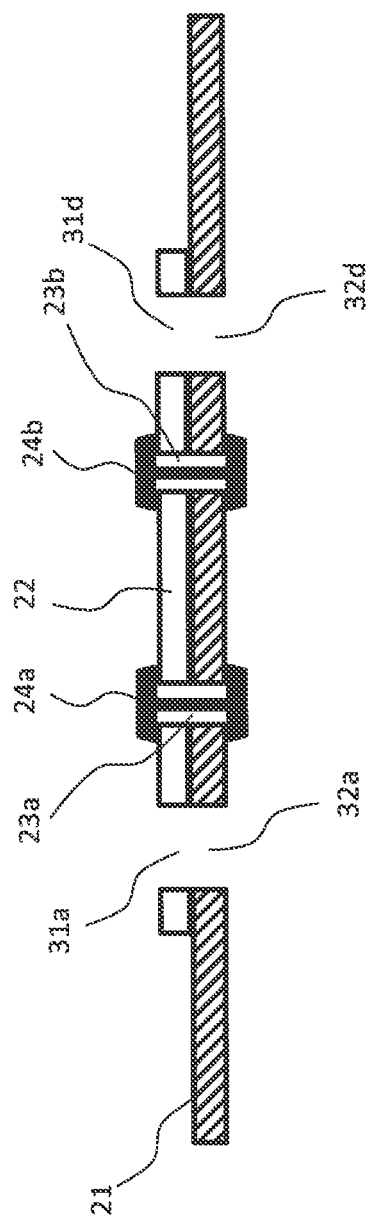
FIG. 3B shows a composite structure having a first plurality of openings and a metal insert having a second plurality of openings of a bolster assembly of a front end module for vehicle, according to one or more embodiments of the invention.

FIGS. 3A-3C show step-by-step manufacturing process of the bolster assembly 10 according to one or more embodiments. As shown in FIG. 3A, first, a composite structure 21 having a first plurality of openings 32a-32d and a metal insert 22 having a second plurality of openings 31a-31d of a bolster assembly 10 are manufactured separately, and then, placed next to each other such that the first plurality of openings 32a-32d are aligned with the second plurality of openings 31a-31d. The first plurality of openings 32a-32d and the second plurality of openings 31a-31d may have an equal or different number of openings. If the composite structure 21 and the metal insert 22 have different number of openings, or if the composite structure 21 and the metal insert 22 have the same number of openings, only some or all of the first plurality of openings 32a-32d are aligned with the second plurality of openings 31a-31d. The first plurality of openings 32a-32d and the second plurality of openings 31a-31d may have substantially the same shape and size. The first plurality of openings 32a-32d and the second plurality of openings 31a-31d may have different shapes and sizes. Each opening of the first plurality of openings 32a-32d may have a corresponding opening from the second plurality of openings 31a-31d, making a pair of matching openings, one of the pair being on the composite structure 21 and the other of the pair being on the metal insert 22. For example, the opening 31a and the opening 32a are a pair of matching openings.

After aligning the composite structure 21 and the metal insert 22, a plurality of rivets 24a-24b are inserted in all or some of the aligned first plurality of openings 32a-32d and second plurality of openings 31a-31d. Being aligned is defined as being in a position that the plurality of rivets 24a-24b can be inserted to attach the composite structure 21 and the metal insert 22 to each other.

The plurality of rivets 24a-24b may be punched or screwed to hold together and/or fix the composite structure 21 and the metal insert 22 to produce a first assembly. The plurality of rivets 24a-24b may be of the same size and/or material. Alternatively, the plurality of rivets 24a-24b may be of different size and/or material.

In one or more embodiments, a fixing procedure for attaching the composite structure 21 and the metal insert 22 to produce the first assembly may include, first, inserting a plurality of rivet holders 23a-23b to temporarily secure the alignment of the composite structure 21 and the metal insert 22 during the manufacturing process, and then, inserting the plurality of rivets 24a-24b to permanently fix the composite structure 21 to the metal insert 22.

After attaching the composite structure 21 and the metal insert 22 to produce the first assembly, the composite structure 21 and the metal insert 22 are over-molded to produce a second assembly that include the first assembly and an injected plastic structure 25, as shown in FIG. 3C. In one or more embodiments, the injected plastic penetrates through one or more than one of the aligned first plurality of openings 32a-32d and second plurality of openings 31a-31d to produce one or more injected plastic rivets 25a-25b. The injected plastic structure 25 may also include a plurality of ribbings 25c-25d. The injected plastic structure 25 may cover all of the composite structure 21 and the metal insert 22, or may cover some portion of the composite structure 21 and the metal insert 22, as shown in FIG. 3C. In one embodiment, the injected plastic structure 25 may cover, surround, or embed all of the composite structure 21 and not all of the metal insert 22. In another embodiment, the injected plastic structure 25 may cover, surround, or embed all of the metal insert 22 and not all of the composite structure 21.

As shown in FIG. 3C, the first end 26a and the second end 26b of the metal insert 22 are in direct contact with the injected plastic structure 25 to increase a shearing resistance of the bolster assembly 10. Therefore, the plurality of rivets 24a-24b observe a minimum amount of a stress that may result from application of a force to the metal insert 22. The first end 26a and the second end 26b of the metal insert 22 transmit majority of the force to the plurality of ribbing feet 25c-25d of the injected plastic structure 25 through a tied contact between the metal insert 22 and the injected plastic structure 25.

Examples of materials that may be used in the bolster assembly include, but are not limited to, thermoplastic resins as matrices with polypropylene (PP) and nylon (polyamide or PA); compression-moldable glass-mat thermoplastic (GMT) composites with chopped-fiber mats, in which GMT may be replaced by injection-molded pelletized long-fiber thermoplastics (LFT), PA, and PP; inline-compounded (ILC) injection- or compression-molded direct-LFT (D-LFT).

The plurality of crash sensors 30a-30b may be attached to the composite structure 21 and/or the metal insert 22, and/or the injected plastic structure 25, and/or the front end module 11. Because the dynamic behavior of front end module as disclosed in one or more embodiments of the present application is different from a dynamic behavior of a corresponding module made of a single material made of, for example prepregs using thermoplastic resin, it is difficult to implement crash sensors, by the OEMs due the difference in dynamic behavior and/or dynamic rigidity of front end modules. If crash sensors that are calibrated with metal front end modules are attached to a front end module that is made of an organosheet or composite thermoplastic, they require complete or partial re-calibration. Accordingly, one or more embodiments of the present disclosure provide the advantage of the bolster assembly having the same or similar dynamic behavior of an assembly made of metal. Therefore, a re-calibration of crash sensors is not required.

Figure 4:
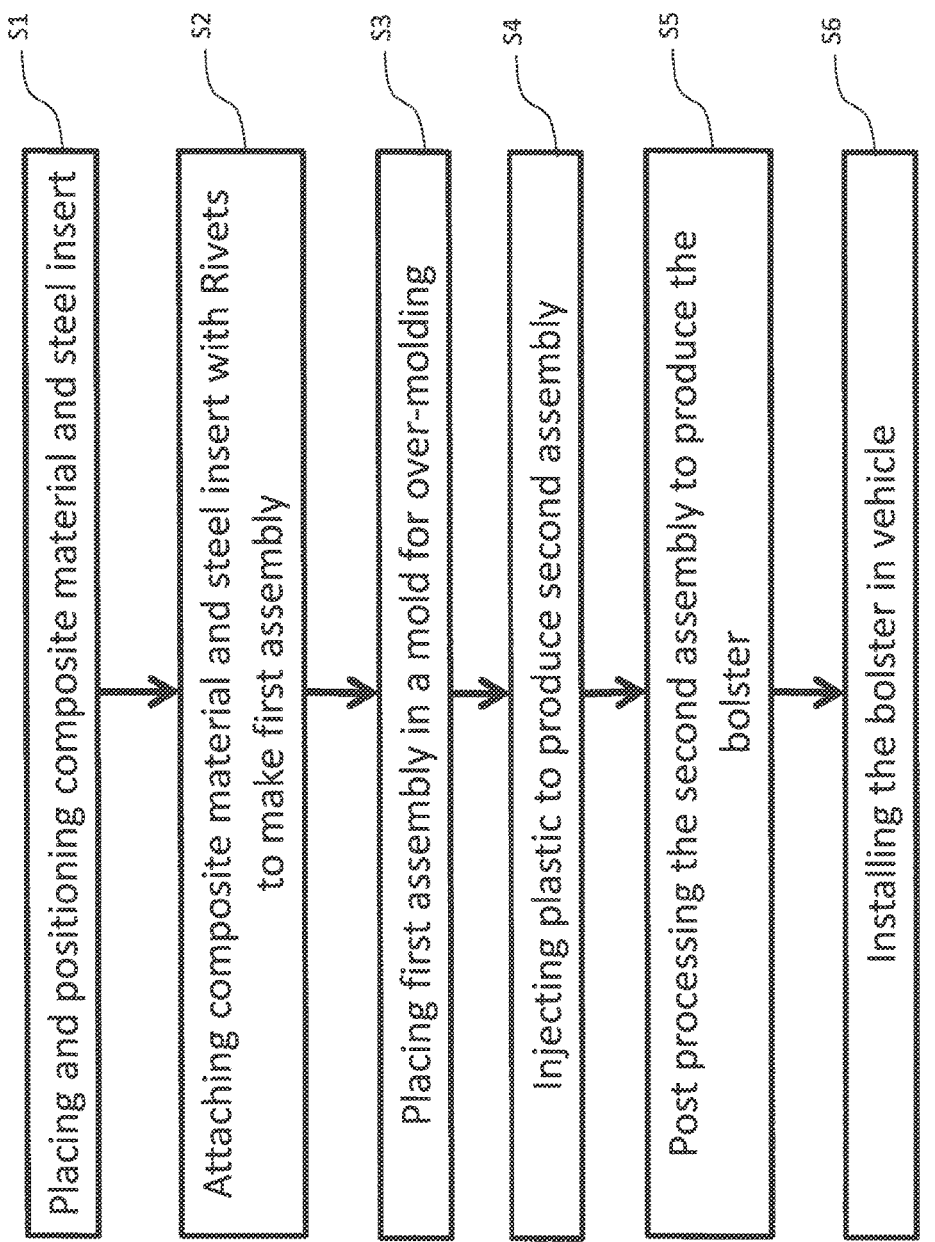
FIG. 4 shows a flow chart of a method for manufacturing a bolster assembly of a front end module for a vehicle according to one or more embodiments of the invention.

FIG. 4 shows a flow chart of a method for manufacturing a bolster assembly of a front end module for a vehicle according to one or more embodiments of the invention. In step S1, a composite structure 21 having a first plurality of openings 32a-32d and a metal insert 22 having a second plurality of openings 31a-31d of a bolster assembly 10, which have been manufactured separately, are placed next to each other and position with respect to each other such that the first plurality of openings 32a-32d are aligned with the second plurality of openings 31a-31d, as shown in FIG. 3A. Being aligned is defined as being in a position that the plurality of rivets 24a-24b can be inserted to attach the composite structure 21 and the metal insert 22 to each other.

In step S2, a plurality of rivets 24a-24b are inserted in all or some of the aligned first plurality of openings 32a-32d and second plurality of openings 31a-31d to manufacture a first assembly, as example of which is shown in FIG. 3B. In one or more embodiments, the attaching procedure in step S2, for attaching the composite structure 21 and the metal insert 22 to produce the first assembly may include, first, inserting a plurality of rivet holders 23a-23b to temporarily secure the alignment of the composite structure 21 and the metal insert 22 during the manufacturing process, and then, inserting the plurality of rivets 24a-24b to permanently fix the composite structure 21 to the metal insert 22.

In steps S3 and S4, the first assembly is placed in a mold for over-molding and injecting plastic to produce a second assembly an example of which is shown in FIG. 3C that include the first assembly and an injected plastic structure 25. In one or more embodiments, in step S4, the injected plastic may penetrate through one or more than one of the aligned first plurality of openings 32a-32d and second plurality of openings 31a-31d to produce one or more injected plastic rivets 25a-25b. The injected plastic structure 25 may also include a plurality of ribbings 25c-25d. The injected plastic structure 25 may cover all of the composite structure 21 and the metal insert 22, or may cover some portion of the composite structure 21 and the metal insert 22.

In step S5, post-processing of the second assembly is performed to remove excess plastic from second assembly to produce the bolster. In step S6, the manufactured bolster is installed in a vehicle or in a frond end module of a vehicle.

Embodiments of the invention improve the shearing behavior of the full front-end assembly as the risk of high shear stress on the mechanical links (rivets) is solved by the mechanical link between the ribbings and the metallic insert. Specifically, when a force is applied to the insert, the rivet will perceive very small amount of stress as the edges of the inserts will transmit most of the forces to the ribbing feet through a tied contact between the steel and the plastic.

The invention consists of a composite part that is reinforced locally with steel inserts that will introduce ductility in the assembly at the desired locations and also avoid performing the calibration again after a material change. The metal insert is used as a reinforcement for crash and dynamic behavior. The overmolding improves the mechanical behavior and component integration.

While the present disclosure has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What claimed is:

1. A bolster assembly of a front end module for a vehicle, comprising:
    a composite structure having a first plurality of openings;
    a metal insert having a first end, a second end, and a second plurality of openings;
    a plurality of rivets that are inserted into the first plurality of openings of the composite structure and the second plurality of openings of the metal insert to fix the composite structure to the metal insert, the first plurality of openings being aligned with the second plurality of openings; and
    an injected plastic structure having a plurality of ribbing feet that holds together the composite structure and the metal insert.

2. The bolster assembly according to claim 1, wherein the first end and the second end of the metal insert are in direct contact with the injected plastic structure to increase a shearing resistance of the bolster assembly.

3. The bolster assembly according to claim 1, wherein the plurality of rivets observe a minimum amount of a stress that results from application of a force to the metal insert.

4. The bolster assembly according to claim 1, wherein the first end and the second end of the metal insert transmit majority of the force to the plurality of ribbing feet of the injected plastic structure through a tied contact between the metal insert and the injected plastic structure.

5. The bolster assembly according to claim 1, further comprising a plurality of crash sensors attached to the front end module.

6. The bolster assembly according to claim 5, wherein the plurality of crash sensors are calibrated according to a dynamic behavior of a second bolster assembly of a second front end module for the vehicle that is constructed, and wherein the second bolster assembly is made of metal.

7. The bolster assembly according to claim 1, wherein the composite structure is a thermoplastic composite material selected from a group consisting of: plastic, resin, and elastomer.

8. The bolster assembly according to claim 1, wherein the metal insert is steel or stainless steel.

9. A method of manufacturing a bolster assembly of a front end module for a vehicle, the method comprising:
    placing and positioning a composite structure and a metal insert with respect to each other to align a first plurality of openings of the composite structure with a second plurality of openings of the metal insert;
    affixing the composite structure and the metal insert to each other with a plurality of rivets to construct a first assembly;
    placing the first assembly in a mold for overmolding; and
    injecting plastic into the mold to overmold the first assembly to produce a second assembly.

10. The method of claim 9 further comprising:
    post-processing the second assembly to remove excess plastic from second assembly to produce the bolster.

11. The method of claim 9, wherein the first end and the second end of the metal insert is in direct contact with the injected plastic to increase a shearing resistance of the bolster assembly.

12. The method according to claim 11, further comprising:
    attaching a plurality of crash sensors are attached to the front end module.

13. The method according to claim 12, wherein the plurality of crash sensors are calibrated according to a dynamic behavior of a second bolster assembly of a second front end module for the vehicle, and wherein the second bolster assembly is made of metal.

* * * * *